Patented Feb. 5, 1929.

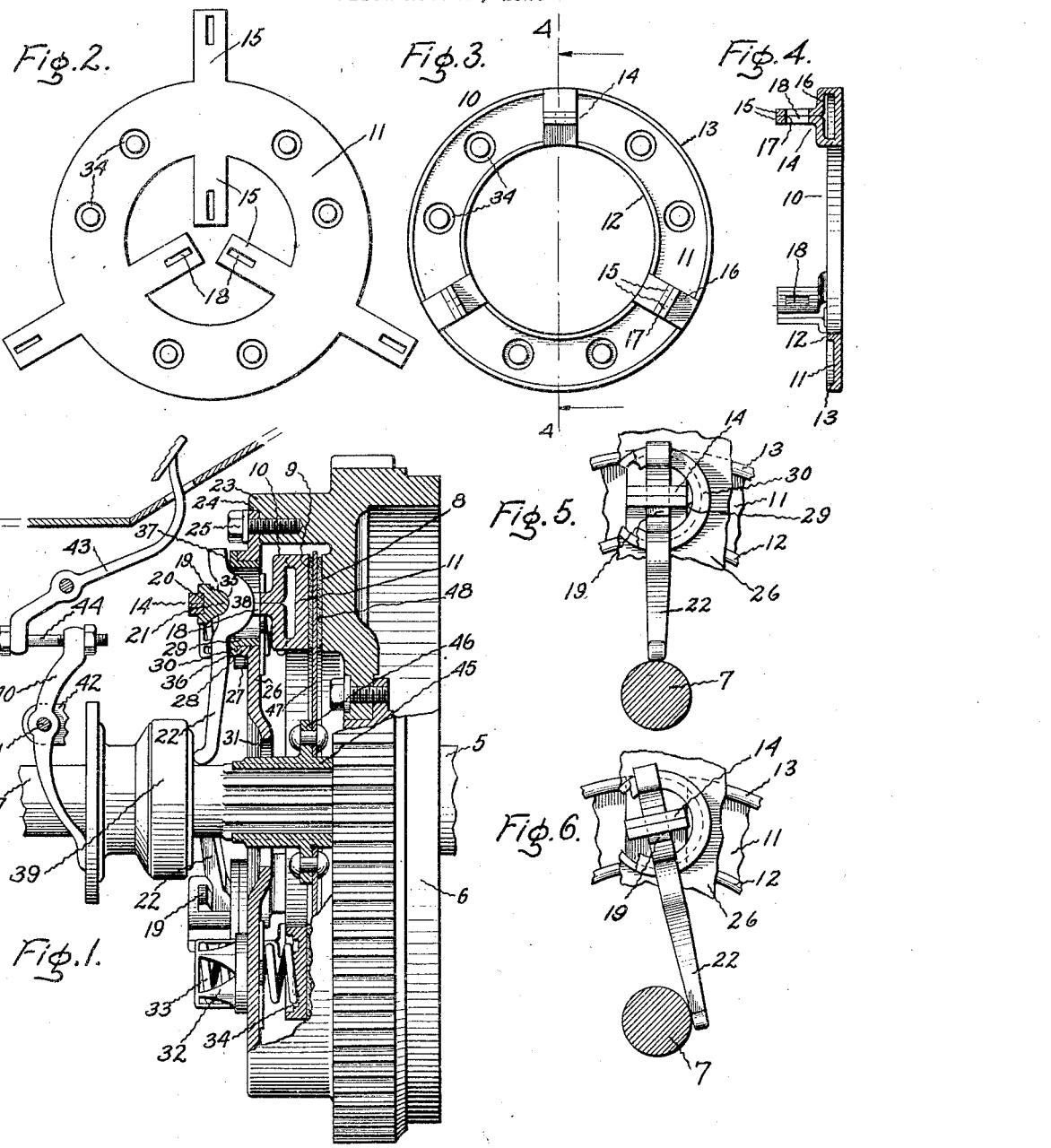
Feb. 5, 1929.  J. A. GUAY  1,700,932
FRICTION CLUTCH
Filed Nov. 12, 1925
INVENTOR:
JOSEPH A. GUAY.
BY Alfred V. Bobst
HIS ATTORNEY.

1,700,932

UNITED STATES PATENT OFFICE.

JOSEPH ARTHUR GUAY, OF LYNN, MASSACHUSETTS, ASSIGNOR TO CHRISTOPHER HAIGH, OF WINTHROP, MASSACHUSETTS.

FRICTION CLUTCH.

Application filed November 12, 1925. Serial No. 68,536.

The present invention relates to friction clutches such as are used in connection with automobiles, for example, for connecting the driving shaft to the driven shaft, and especially to friction clutches which embody as a part of their structure, a ring having a friction surface and which serves as one of the parts between which the clutch disk is clamped.

One object of my invention is to provide an improved friction clutch which is simple in structure, reliable in operation, easily assembled, and capable of being manufactured at a low cost.

A further object of my invention is to provide an improved friction clutch ring of the type referred to above which while being strong and durable, and thoroughly reliable in operation, is at the same time, capable of being manufactured at low cost and with a high degree of accuracy.

For a consideration of what I believe to be novel and my invention, attention is directed to the following description and the claims appended thereto.

In the drawing, wherein is illustrated one embodiment of my invention, Fig. 1 is a side elevation, partly in section, of a friction clutch embodying my invention; Fig. 2 is a plan view of a blank adapted to be used in the constructing of a friction clutch ring; Fig. 3 shows the blank of Fig. 2 after it has been formed into a clutch ring; Fig. 4 is a sectional view taken on line 4—4, Fig. 3; Fig. 5 is a detail face view of certain parts, and Fig. 6 is a detail face view of a modification.

Referring to the drawing, 5 indicates a driving shaft, for example, the crank shaft of an automobile engine, 6 a fly wheel carried by shaft 5, and 7 a driven shaft which functions in the driving of the rear wheels. On fly wheel 6 is a friction surface 8 which forms one of the friction surfaces of the clutch. Cooperating with friction surface 8 is a friction surface 9 on a friction clutch ring 10. Clutch ring 10 is a pressed steel member comprising an annular base 11 having inner and outer rims or flanges 12 and 13 at its edges which serve to give strength and rigidity to it. Carried by and forming a part of the clutch ring are a plurality of circumferentially spaced posts 14, three posts spaced 120 degrees apart being shown in the present instance. Each post is formed from two fingers 15 which are integral with flanges 12 and 13, the fingers extending first transversely of base 11 to the center of the base as is indicated at 16 and then outwardly in contact with each other as is indicated at 17. In each post is a transverse elongated opening 18 spaced inward from the outer end of the post and arranged at the outer edge of such opening is a holding member 19 which serves to fasten the outer ends of the fingers 15 together. To this end, member 19 is provided with a groove 20 in its edge in which the portions of the fingers at the outer edge of opening 18 are held, the same being squeezed tightly therein. In addition to this fastening means or in lieu thereof, if found desirable, other fastening means may be provided. The inner end of member 19 is rounded as is shown at 21 to provide a bearing for a clutch actuating arm 22.

Clutch ring 10 may be formed with advantage from a blank such as that shown in Fig. 2. This blank may be stamped from sheet material such as steel of suitable thickness, the openings 18 being cut in fingers 15, and then bent up to the desired shape, such as that which is shown in Fig. 3. This construction has the advantage that it enables the clutch ring to be formed from flat stock by means of dies. As is known, pressed parts made from dies are, for all practical purposes, exactly alike. Also, by this method of manufacture, uniformity of product is obtained at comparatively low cost. The construction of the clutch ring from pressed metal, therefore, is of substantial advantage from a manufacturing standpoint and I regard this as being an important feature of my invention.

Fly wheel 6 has a rearwardly projecting wall 23 provided with an annular rabbet 24 in its edge. Fastened to wall 23 by a ring of bolts 25 is a cover plate 26, the peripheral edge of which is located in rabbet 24. Cover plate 26 has three circumferentially spaced openings 27 through which posts 14 project. Openings 27 are surrounded by collars 28, and in the openings are bushings or liners 29 which fit tightly in the openings and are provided with flanges 30 which lie against the ends of collars 28. These bushings are made of hard material to provide suitable wearing surfaces. In cover plate 26 is a central opening 31 through which shaft 7 projects. Carried by the cover plate are a plurality of circumferentially spaced spring cages 32 suitably fastened in openings in the cover plate, and in each cage is a clutch spring 33 which at one end engages the end of the spring cage and at the other end the base 11 of the clutch ring, the base being provided with grooves 34 to hold the inner ends of the springs stationary. In the present instance six springs and spring cages are indicated, this being a number which I have found to be satisfactory. The spring cages may be, with advantage, of the specific construction disclosed in my application Serial No. 52,407, filed August 25, 1925, and this is the construction shown in the drawing.

In each of the openings 18 is an actuating arm 22, the inner end of which extends radially inward into proximity to shaft 7. Each actuating arm 22 has a seat 35 for the rounded portion 21 of member 19, and on each side of seat 35 the arm has flat surfaces 36 and 37 adapted to engage the outer surface of flange 30. Between surfaces 36 and 37 the lever arm is thickened in a radial direction as is indicated at 38, this portion of the arm extending well within the outer surface of flange 30. This serves to prevent the arm from coming out of the opening 18.

Clutch ring 10, cover plate 26, actuating arms 22, and clutch springs 33 form a unitary clutch structure which provides the movable element of the clutch and the operating means for it. This clutch structure is assembled as a unit and is attached to the fly wheel as a unit. In assembling it, springs 33 are placed in spring cages 32 and the cover plate 26 and clutch ring 10, with the springs between them, are then placed in a press and squeezed together until posts 14 project through openings 27 far enough to permit of the ends of arms 22 being inserted into openings 18. After arms 22 are in place, the press is opened, whereupon springs 33 force the cover plate and clutch ring apart until flanges 30 engage surfaces 36 and 37. This completes the assembling of the unit.

With the foregoing arrangement, it will be seen that the actuating arms 22 serve to hold the structure assembled, no screws or pins being required. Also when assembled, the structure cannot accidentally come apart for arms 22 cannot come out of openings 18 under any ordinary conditions. They can be removed only by placing the structure in a press and forcing the cover plate and clutch ring together. The structure comprises few parts, all of which are capable of being manufactured at low cost. It can be assembled as a unit at low cost, and when assembled it can be handled as a unit and applied to the fly wheel as a unit. This latter feature is of importance not only because of the ease with which it enables assembling on the fly wheel to be carried out but also because of the fact that by the arrangement the unitary clutch structures become interchangeable and may be placed on a fly wheel without reference to the particular position relative to the fly wheel. As a result, the unitary clutch structure may be removed and replaced without regard to its exact position on the fly wheel. This does away with the necessity of doweling the clutch structure to the fly wheel in order to insure that the clutch structure is put back in exactly the same position if removed, for with the construction described, it is not necessary that it be put back in the same position.

The radially inner ends of actuating arms 22 terminate adjacent to shaft 7, and slidably mounted on the shaft is a clutch actuating member 39 adapted to be moved axially on shaft 7 to force the inner ends of arms 22 inward for throwing the clutch to "out" position. Member 39 is moved by a forked actuating lever 40 pivoted at 41 on a bracket 42 and arranged to be moved by a foot pedal 43 connected to lever 40 by a bolt 44. This actuating means for arms 22 is shown only by way of example and is to be taken as typical of any suitable means for moving arms 22 on their pivots.

Splined on shaft 7 is a sleeve 45 having a flange 46 to which is fastened a clutch disk 47 of any suitable structure, the same having facings 48 of suitable friction material with which friction surfaces 8 and 9 engage.

When the unitary clutch structure is assembled and prior to its being mounted on the fly wheel, springs 33 hold flanges 30 on bushings 29 in engagement with surfaces 36 and 37 on arms 22. When the unitary structure is bolted to the fly wheel, the arrangement is such that friction surface 9 engages the clutch disk facing 48 prior to the complete seating of the edge of cover plate 26 in rabbet 24 so that when bolts 25 are screwed in forcing the cover plate against its seat on flange 23, the cover plate will be moved in somewhat relatively to clutch ring 10 thus providing a slight clearance between flanges 30 and surfaces 36 and 37. This permits the structure to take up automatically for wear of the clutch plate surfaces by an amount equal to the initial clearance. However, the amount is definitely limited so that in no case can the frictional surface 9 of clutch ring 10 be injured due to its coming into engagement with a worn out clutch plate.

When assembled on the fly wheel, the parts assume the positions shown in Fig. 1, the clutch being in "in" position. To throw the clutch to "out" position, foot pedal 43 is pushed down, thus moving member 39 axially against the ends of arms 22. This forces the inner ends of arms 22 inward, and in moving inward flat surfaces 36 pivot on flanges 30 and the outer ends of arms 22 pull clutch ring 10 away from the fly wheel friction surface 8 against the action of springs 33, thereby releasing clutch disk 47. When the foot pedal is released again, springs 33 again force clutch ring 10 into engagement with the clutch plate, thus gripping the clutch disk between the friction surfaces 8 and 9. When the clutch is in "in" position, shaft 5 drives shaft 7 through the intermediary of clutch plate 47, by means of the fly wheel 6 and friction surface 8 on the one side and cover plate 26, posts 14 and friction surface 9 on the other side. In the case of the clutch ring 10, it will be seen that it is driven directly by the cover plate through the posts 14, there being no direct connection between the ring and the fly wheel. Posts 14 thus serve to form the driving connection and also as the connecting means between the arms 22 and clutch ring 10.

In the present instance, the clutch is shown as being arranged to be thrown to "out" position by moving the inner ends of arms 22 inward. However the clutch structure adapts itself to being thrown to "out" position by moving the arms in the other direction, in which case flat surfaces 37 pivot on flanges 30. Otherwise the operation of the structure would be the same as that heretofore described.

In the construction shown in Figs. 1 to 5, actuating arms 22 extend radially as is shown particularly in Fig. 5, terminating directly at the periphery of shaft 7. However, arms 22 may extend to the sides of shaft 7 as is shown in Fig. 6, in which case posts 14 may be twisted as is shown in Fig. 6, or other arrangement used, to make openings 18 face in the desired direction.

The clutch construction disclosed in this application has certain features in common with the construction disclosed in my application Serial No. 52,407 above referred to, and such features are claimed in such other application.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. A clutch ring of pressed metal, said clutch ring comprising an annular base, flanges integral with the edges of said base, and projecting posts integral with said flanges.

2. A clutch ring of pressed metal, said clutch ring comprising an annular base, flanges integral with the edges of the base, fingers formed integral with said flanges which extend first transversely of the ring and then outwardly to form posts, and means for fastening the parts of the posts together.

3. A clutch ring of pressed metal, said clutch ring comprising an annular base having a friction surface, flanges integral with the edges of the base, and fingers formed integral with said flanges which extend first transversely of the base and then outwardly to form posts.

4. A clutch ring comprising an annular base having a friction surface, flanges integral with the edges of the base, fingers integral with said flanges which project outwardly to form posts, said fingers having openings at their outer ends, and clamping means in said openings for fastening the fingers together.

5. A clutch ring comprising an annular base having a friction surface, flanges integral with the edges of the base, fingers integral with the edges of the flanges, said fingers projecting outwardly to form posts and having openings at their outer ends, and means in said openings which serve to fasten the fingers together and to form pivot blocks for a clutch actuating arm.

6. A clutch ring of pressed metal, said clutch ring comprising an annular base, flanges integral with the edges of the base, fingers formed integral with said flanges which extend first transversely of the ring and then outwardly to form posts, said fingers having openings at their outer ends, and means in said openings which serve to fasten the fingers together and to form pivot blocks for a clutch actuating arm.

In witness whereof, I have hereunto set my hand this 5 day of Nov., 1925.

JOSEPH ARTHUR GUAY.